Apr. 10, 1923.　　　　W. B. ECKER　　　　1,450,944
TIRE SPREADER
Filed Aug. 2, 1917　　　　2 sheets-sheet 1

Inventor:
William B. Ecker
By Cheever & Cox
Att'ys

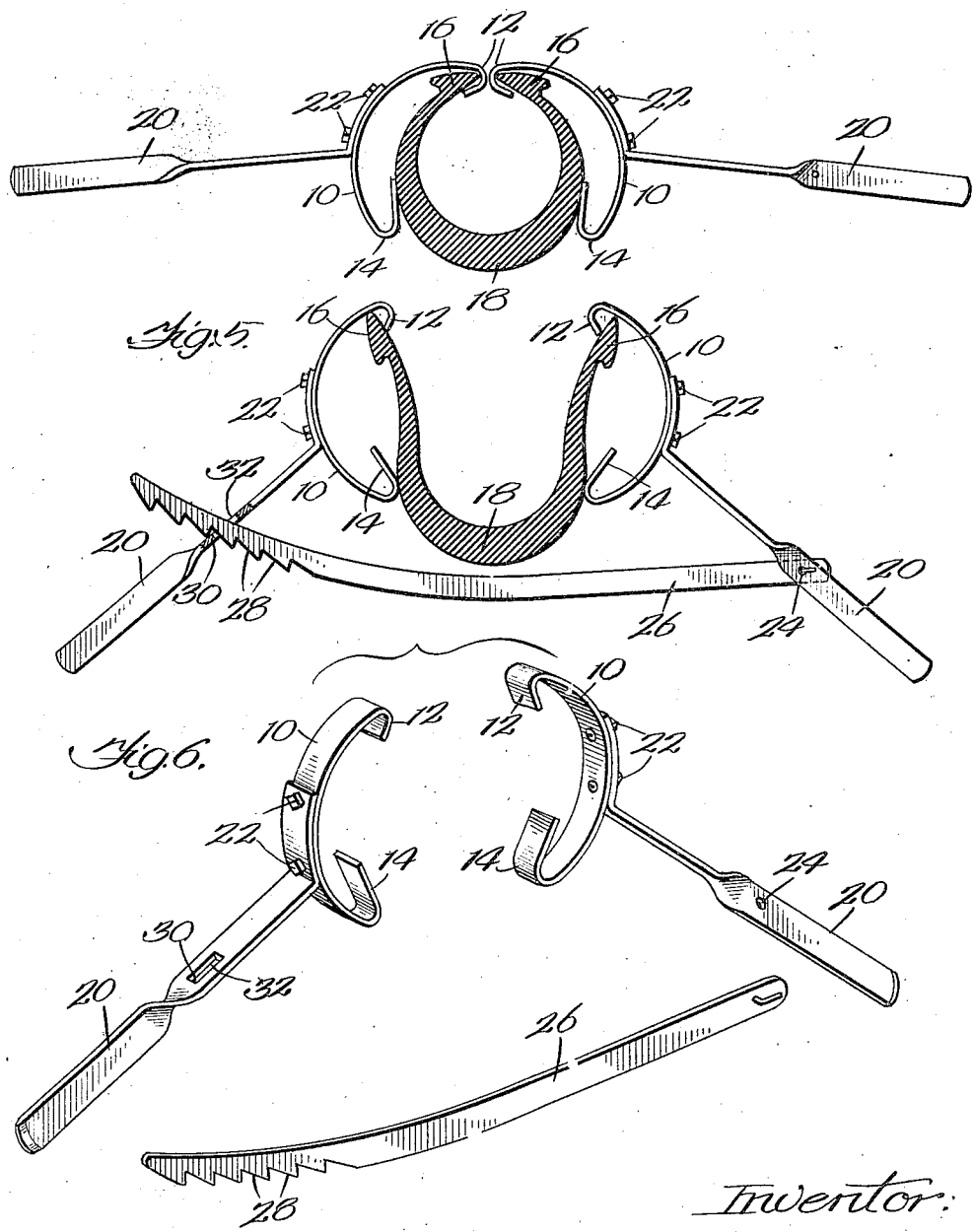

Patented Apr. 10, 1923.

1,450,944

UNITED STATES PATENT OFFICE.

WILLIAM B. ECKER, OF CHICAGO, ILLINOIS, ASSIGNOR OF ONE-FOURTH TO DWIGHT B. CHEEVER, OF CHICAGO, ILLINOIS.

TIRE SPREADER.

Application filed August 2, 1917. Serial No. 184,020.

*To all whom it may concern:*

Be it known that I, WILLIAM B. ECKER, a citizen of the United States, residing at Chicago, in the county of Cook and State of Illinois, have invented a certain new and useful Improvement in Tire Spreaders, of which the following is a specification.

As is well understood, ordinary pneumatic tires for automobiles and the like are made in the form of annular hollow rings of strong elastic material, usually rubber, of generally circular cross-section. These rings tend to normally hold their shape with the result that it is quite difficult to spread the side walls of the tire away from the inner circumferential cut provided in the tire for the insertion and removal of the ordinary inner tube, and to hold them in said spread out position for examination of the inner walls of the tire casing and the repair thereof.

This invention is a handy tool or a multiplicity of them of size and shape for convenience in carrying in the ordinary automobile tool box, adapted for ready application to the edges of the automobile tire along the inner circumferential opening therein, hereafter, for convenience, called lips, at any point around the tire to spread the tire open along its circumferential cut for ready examination. The object of the invention is to provide a tool of this class which can be readily and cheaply made, which is satisfactory in operation and is not readily liable to get out of order. The invention consists in a device for carrying out the foregoing objects, and in the special features and details hereafter more fully set forth in the specification and claims.

Referring to the drawings, in which similar numerals indicate the same parts throughout the different views, Figure 1 is a perspective view of an ordinary automobile tire having a pair of tools illustrating this invention in its preferred form applied thereto and moved to such a position that the tire is partially open for ready examination of the interior.

Figure 4 is a view corresponding to Figure 2, but with the tools of this invention in reversed position, so that they may be more readily manipulated when it is desired to only partially open the tire as shown in Figure 5, and, without injury to the tire, hold it in that position for some time, for the application of a patch.

Figure 5 shows the tire thus partially opened, and in addition shows a locking bar applied to the pair of tools proper for securing the tire in opened position.

Figure 6 is a perspective view of the tire tools of Figure 5 and the locking bar, the parts being separated one from another.

The essential device of this invention is a single tire tool having a reversible member adapted to take hold of the tire as hereafter more fully set forth, the same being equipped with a handle, preferably set at an acute angle thereto so that, as heretofore pointed out in describing the drawings, different amounts of tire opening may be conveniently obtained, and also so arranged that in one position of the device, when two hook mechanisms are used on opposite sides of the tire, the two handles may be fastened together by a rigid bar across the tread circumference of the tire to hold the tire permanently spread open but without its being bent enough to injure it.

Figure 1:
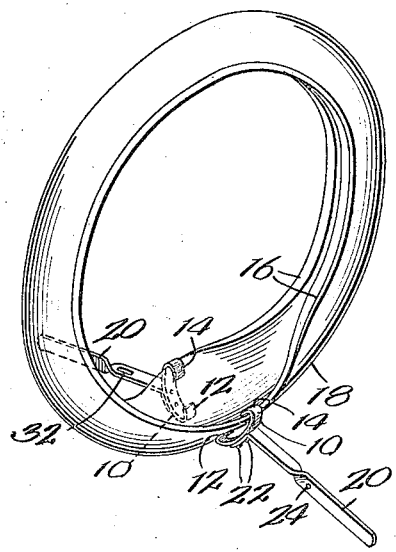
Figure 2:
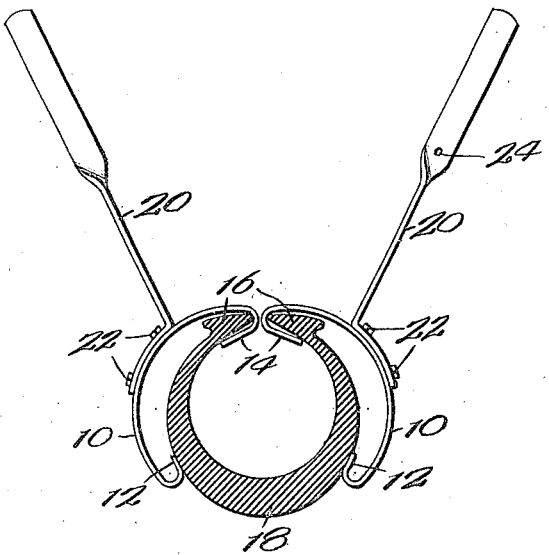
Figure 2 is a sectional view through one side of the tire illustrating two of the tools of this invention applied thereto preparatory to flattening out that portion of the tire for complete examination of the interior of the casing.
Figure 3:
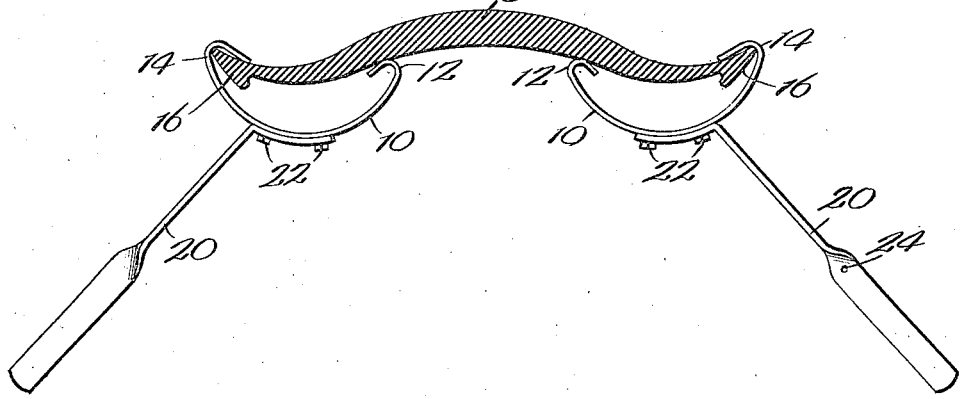
Figure 3 is a changed position view of the parts of Figure 2, showing the tire completely opened.

The reversible engaging member, referred to, consists preferably of a curved metallic member 10 having at opposite ends contact members 12 and 14, preferably in the form of hooks, so shaped and arranged that when one hook, as 12, is placed over the edge or lip 16 of the tire 18 as shown for instance in Figure 4, the outside of the other contact member or hook 14 takes bearing against the tire wall at a point toward the outer or tread circumference of the tire so as to act as a fulcrum about which the side of the tire is bent when the operator takes hold of the handle 20 attached to the engaging member, preferably at an acute angle to the central axis of the engaging member and rotates the tool from the position of Figure 2 to that of Figure 3 or from the position of Figure 4 to that of Figure 5 as the case may be.

In the drawings the engaging members 10 and the handle 20 are made in separate pieces attached together by screws or rivets 22, but it is entirely obvious that they may be cast or otherwise made in one piece, without departing from this invention.

In the preferred form of tool shown in Figures 4 and 5, the handle 20 is so placed with reference to the member 10 that it makes a substantially obtuse angle with that portion of member 10 which carries the hook 12 which engages the tire lip, this so that when a pair of the tools are applied as shown in these figures, the handles 20 may be connected together by a substantially straight and therefore readily packable member, such as rigid member 26 extending across the tread circumference of the tire to thus hold the tire open for repair without straining the tire. It is to be noted that even in the application shown in Figure 3, the rigid bar 26 might be applied without bending the lips of the tire down below the outer tread of the tire, to do which would probably be injurious.

The automobile user, or garage man, may carry and do effective work with a single tool, but it is far better that he equip himself with two and use them as shown in the drawings and as heretofore described. When this is done, further advantage is obtained by pivotally connecting to one tool handle 20, as at 24, the previously described connecting member or bar 26, adapted to detachably engage the other tool handle 20 so as to selectively secure the two tire tools in any desired position with reference to the tire and thus selectively control the opening of the tire itself. In the particular case here illustrated, the bar 26 is provided with saw teeth 28 to detachably lock to the edge 30 of a slot 32 provided in the adjacent handle 20, through which the bar 26 passes. Other detachable locking devices connecting the tool handles 20 may be provided for the purpose set forth without departing from this invention. Obviously, power operated devices might also be applied for this purpose without departing from the invention.

In the operation of the device, if the user wants to open the tire completely at a given point, he applies his pair of tire tools to the tire as shown in Figure 2, rotates them to the position of Figure 3, and locks them there by the mechanism of Figures 5 and 6 if he cares to do so. The operator can, while making this movement from Figure 2 to Figure 3, stop when the tools on the tire are in the position of Figure 5, and hold the tire in that position by hand, or otherwise, but if he wishes to conveniently lock the tire in the position of Figure 5, it is better to initially reverse the tools and apply them as shown in Figure 4; then move them to the position of Figure 5 and lock them if desired. It is in order to render the tools more readily lockable in both the positions of Figures 3 and 5 that the handles are preferably applied to the engaging member 10 as described.

Having thus described my invention, what I claim as new and desire to secure by Letters Patent, is:—

1. A tire spreader comprising an engaging member provided with oppositely disposed hooks for selective engagement with the lip of a tire, the outer face of each hook being adapted to act as a fulcrum against the outside of the tire when the opposite hook is applied to the tire lip.

2. A tire spreader comprising an engaging member provided with oppositely disposed hooks for selective engagement with the lip of a tire, the outer face of each hook being adapted to act as a fulcrum against the outside of the tire when the opposite hook is applied to the tire lip, and means graspable by an operator for rotating the engaging member about said fulcrum.

3. A tire spreader comprising an engaging member equipped with a hook for the lip of a tire, a fulcrum portion adapted to bear against the outside of the tire, and a handle on the engaging member for movement to rotate the engaging member, said handle extending away from the engaging member at an acute angle to a line perpendicular to the engaging member at its center, and at a substantially obtuse angle with the portion of the engaging member which carries the hook 12, for the purposes set forth.

4. A tire spreader comprising an engaging member provided with oppositely disposed hooks for selective engagement with the lip of a tire, the outer face of each hook being adapted to act as a fulcrum against the outside of the tire when the opposite hook is applied to the tire lip, a handle extending away from the engaging member adapted for movement to rotate said engaging member, said handle being at an acute angle to the engaging member, for the purposes set forth.

5. The combination with a pair of oppositely disposed tire engaging members hooking onto opposite lips of a tire, fulcrum members on the tire engaging members contacting the outside of the tire, handles extending from the engaging members and means adjustably detachably connecting the handles together, across the tread of the tire without deflecting the lips of the tire below its tread.

6. In combination with a pneumatic tire to be spread open, a pair of engaging members each equipped with a hook for the lip of the tire, a fulcrum portion adapted to bear against the outside of the tire at a point remote from the edge of the lip, an arm on each engaging member extending away from the tire, and a rigid connecting member extending across the tread of the tire, detachably connected to said arms, the angularity of the arms to the engaging members being such that a substantially straight connecting member can be used without deflecting the lips of the tire below the tread of the tire.

In witness whereof, I have hereunto subscribed my name in the presence of two witnesses.

WILLIAM B. ECKER.

Witnesses:
 DWIGHT B. CHEEVER,
 M. S. ROSENZWEIG.